United States Patent
White et al.

(10) Patent No.: US 7,640,739 B2
(45) Date of Patent: Jan. 5, 2010

(54) METHOD AND DEVICE FOR USING VOC AS FUEL FOR AN ENGINE

(76) Inventors: Jeffery White, 2234 Olmstead, Dearborn, MI (US) 48124; Mark Wherrett, 46533 Polo Dr., Canton, MI (US) 48187; Patrick Ryan, 40900 Rinaldi Dr., Sterling Heights, MI (US) 48313

( * ) Notice: Subject to any disclaimer, the term of this patent is extended or adjusted under 35 U.S.C. 154(b) by 95 days.

(21) Appl. No.: 10/543,424

(22) PCT Filed: Jun. 20, 2003

(86) PCT No.: PCT/US03/19418

§ 371 (c)(1),
(2), (4) Date: Aug. 29, 2006

(87) PCT Pub. No.: WO2005/008031

PCT Pub. Date: Jan. 27, 2005

(65) Prior Publication Data

US 2007/0079816 A1    Apr. 12, 2007

(51) Int. Cl.
*F01B 29/10* (2006.01)
(52) U.S. Cl. .......................... 60/517; 60/524
(58) Field of Classification Search ............ 60/517–526
See application file for complete search history.

(56) References Cited

U.S. PATENT DOCUMENTS

| 5,248,566 A | | 9/1993 | Kumar et al. |
| 5,439,594 A | | 8/1995 | Regan et al. |
| 5,538,540 A | | 7/1996 | Whitlock |
| 5,676,738 A | * | 10/1997 | Cioffi et al. ............... 95/109 |
| 5,832,713 A | | 11/1998 | Maese et al. |
| 5,904,750 A | * | 5/1999 | Cowles .................... 95/109 |
| 5,968,235 A | * | 10/1999 | Grime et al. .............. 95/123 |
| 6,477,905 B1 | * | 11/2002 | Mitra ................... 73/863.12 |

FOREIGN PATENT DOCUMENTS

| JP | 60 168514 | 9/1985 |
| WO | WO 95/30470 | * 11/1995 |

* cited by examiner

*Primary Examiner*—Hoang M Nguyen
(74) *Attorney, Agent, or Firm*—Damian Porcari

(57) ABSTRACT

A device and method for producing energy from a dilute VOC gas stream. The device includes a concentrator that concentrates a dilute VOC gas stream into a concentrated VOC fuel. The concentrated VOC fuel is supplied to the fuel intake of an engine. The device is operated by adsorbing the dilute VOC onto an adsorbing media within a concentrator. The concentrator increases the concentration of VOC per unit volume. The adsorbed VOC are then desorbed to form a concentrated VOC fuel stream. The concentrated VOC fuel stream may be either liquefied VOC or a more concentrated VOC gas stream. The concentrated VOC fuel stream is then directed to an engine to produce kinetic or electrical energy.

82 Claims, 2 Drawing Sheets

METHOD AND DEVICE FOR USING VOC AS FUEL FOR AN ENGINE

RELATED INVENTION

This patent is filed together with PCT/US03/19416 DEVICE AND METHOD FOR REFORMING A VOC GAS, which is incorporated herein by reference.

FIELD OF THE INVENTION

The present invention is directed to a method and device for converting Volatile Organic Compounds (VOC) into energy. More specifically, the invention relates to a method and device that concentrates a dilute hydrocarbon gas using a concentrator into a gaseous or liquid concentrated VOC fuel. The concentrated VOC fuel is then supplied to the fuel intake of an engine.

BACKGROUND OF THE INVENTION

Various manufacturing, agricultural, contamination remediation and industrial processes produce a waste gas stream having dilute hydrocarbon concentrations generally in air. Some applications include those where the VOC is entrained in a solid or liquid media such as contaminated soil or water. The VOC can be converted to gas and separated from the solid or liquid media. Other processes produce or contain gaseous VOC. A number of processes exist to burn or oxidize the VOC, but the present invention is directed to recovering energy. If the concentration of VOC is sufficiently great, and they are suitable to operate an engine, they may be directly supplied to an engine that produces rotary power or electricity. In other cases, these dilute hydrocarbon concentrations are sometimes insufficient in their energy content to efficiently operate an engine directly. Engines include devices that convert chemical energy into electrical or kinetic energy such as combustion engines (internal or external), Stirling cycle or turbine engines. In other situations, the waste gas stream has sufficient energy content to operate an engine, but the form of the hydrocarbon is such that the engine requires extensive modification to operate using the waste gas directly. For example, the waste gas may include complex hydrocarbons of varying concentrations or particulates. These gases may harm the ECD if they are not treated or converted to reformate.

Manufacturing processes that produce waste gas streams with a dilute hydrocarbon concentration are currently flared or burned or supplied to an engine as part of the combustion air. Flaring the waste gas does not return any energy. Burning the waste gas produces heat. Recovering electrical or kinetic energy is generally much more valuable than recovered heat energy. GB patent application 2364257, published Jan. 1, 2002, and incorporated herein by reference, splits a gas stream having VOC into two streams. The first stream is directed to the combustion air intake of an engine and the second stream is directed to a combustion unit. Exhaust heat from the engine mixes with and combusts the second stream. This reference does not teach concentrating the VOC nor directing the VOC to the fuel intake of the engine. WO9530470, published Nov. 16, 1995, and incorporated herein by reference, teaches a device to burn VOC in an engine by having two adsorption/desorption units so that the waste gas stream and engine may operate independently of one another. The first unit may collect and concentrate VOC as needed and the second unit supplies VOC to the engine as needed. This reference and the GB reference leave the VOC in the combustion air and do not feed the VOC to the fuel intake of the engine. US 2002/0100277 published Aug. 1, 2002, and incorporated herein by reference also teaches directing VOC to an internal combustion engine, but the device does not concentrate the VOC. Their concentration is based on the vapor pressure of the VOC in the container. VOC not directed to the engine are condensed into a liquid by a chiller, but these liquefied VOC are not supplied to the engine as a fuel.

It is known that waste gases can be directly supplied to the combustion or exhaust air of an engine. One commercially available device supplies waste gases from an industrial operation to a turbine engine. In a paper by Neill and Gunter, VOC Destruction using Combustion Turbines, published September 2002, and incorporated herein by reference, describes a device that combines waste VOC with natural gas to operate a gas turbine. The gas turbine produces electricity for the facility. The waste gases come directly from the exhaust air of the industrial operation and are supplied to the engine as part of the combustion air. The turbine engine has a separate fuel source to supply the majority of the fuel. The exhaust air provides a relatively low (200 to 5000 ppm of unburned hydrocarbons and VOC) percentage of the energy content needed to operate the engine. Devices like this require an external fuel supply as part of the normal operation of the device. The external fuel supply is not merely a part of start-up or load leveling operation. These references teach directly supplying VOC to the engine without filtering and require an engine capable of consuming these VOC. By directing the VOC to the combustion air, a very large engine/generator is needed. The example given in Neill and Gunter is a 20MW turbine to abate 150,000 Standard Cubic Feet per Minute (scfm) of air.

U.S. Pat. No. 5,451,249, issued Sep. 19, 1995, and incorporated herein by reference, teaches a device and method to supply a gas stream from a landfill to be used as the fuel source of a fuel cell. The natural gas component of the landfill gas is desirable and the VOC contained in the landfill gas is removed and are not used to supply fuel to the fuel cell. The 5,451,249 patent describes heavy hydrocarbons as contaminant fractions that must be removed from the gas stream prior to reforming. Rather than teaching that these VOC are a contaminant, the present invention utilizes these hydrocarbons as the fuel for an engine.

The present invention is directed to a device and method to utilize the energy from VOC by using the VOC as the primary fuel for an engine. The present invention is capable of producing high value kinetic or electrical energy from waste gases. The invention reclaims dilute VOC from a waste gas stream. The invention will be illustrated using exhaust air from an automotive paint booth, but many other manufacturing, chemical, industrial, agricultural, and waste management processes produce dilute VOC gas streams that would be suitable for this invention. The dilute VOC gas stream are organic compounds that evaporate readily into air and may contain straight chain, branched, aromatic, or oxygenated hydrocarbons. The invention has the dual advantage of abating the hydrocarbons while producing energy. The engine may be any variety of internal or external combustion engine, a Stirling cycle engine, a gas turbine or another engine that can produce kinetic energy usually in the form of output shaft power, or electricity. The invention is an energy efficient method to utilize the hydrocarbons entrained in the gas stream present in, or exhausted from, manufacturing, industrial, agricultural, environmental, chemical or waste processes.

SUMMARY OF THE INVENTION

The present invention provides for a device and method for producing energy from a dilute VOC gas stream. The device includes a concentrator that concentrates a dilute VOC gas stream into a concentrated VOC fuel. The concentrated VOC fuel is supplied to the fuel intake of an engine. The device is operated by adsorbing the dilute VOC onto an adsorbing media within a concentrator. The concentrator increases the concentration of VOC per unit volume. The adsorbed VOC is then desorbed to form a concentrated VOC fuel. The concentrated VOC fuel may be either liquefied VOC or a gaseous concentrated VOC fuel. The concentrated VOC fuel is then directed to an engine to produce kinetic or electrical energy.

Most industrial concentrators desorb with hot air. Because of the risk associated with allowing the concentration of hydrocarbons to approach the Lower Explosion Limit (about 1½% hydrocarbon by volume), the concentrations associated with gases in these devices never become sufficiently fuel rich for the desorbate to act as the primary fuel for an engine. As described in the Background of the Invention, prior art devices merely supplied the desorbate to an engine as part of the combustion air. The engine requires a separate fuel supply to operate and must be sized substantially larger then needed by the present invention.

The device receives waste gas from a manufacturing or other process. If the gas is prone to contain particulates, it is filtered through a multiple stage filtration device prior to being concentrated. Then, the gas is directed into an adsorption chamber where the VOC are removed from the waste stream onto an adsorbing media. The adsorbent media is isolated from the VOC laden gas source and heated to release, or desorb, the VOC at regular intervals. The timing of the desorb cycle is such that the level of VOC saturation on the adsorbent media does not exceed a predetermined level. Heating the VOC laden adsorbent media causes the VOC to flash to high temperature vapor, which is then directed to an engine. Various embodiments of the invention use condensers to further process the fuel stream, as necessary, for introduction into the engine. The water and $CO_2$ gases resulting from combustion in the engine are exhausted to the atmosphere. A control device is used to monitor and control the sequence.

A variety of engines may be utilized to convert the concentrated fuel into energy. Generators may be used to convert kinetic energy into electricity. In one embodiment, a dilute VOC laden gas stream passes through optional multiple stage particulate filters and an adsorption/desorption concentrator. VOC is stripped from the gas and adhere to the adsorbent media. The clean gas is vented to atmosphere or used elsewhere in the process, and a sweep gas passes over the adsorbent material to desorb the adhered VOC. The sweep gas may be steam, inert combustion products, a gaseous fuel such as methane or another alkane, or other gas that does not oxidize or react with the adhered VOC or adsorbent material. The concentrated sweep gas-VOC mixture then passes into the fuel inlet of an engine to generate electricity.

In another embodiment, the VOC laden gas stream passes through optional multiple stage particulate filters and an adsorption/desorption concentrator. VOC is stripped from the gas and adhere to the adsorbent media. The clean gas is vented to atmosphere or used elsewhere in the process. An inert gas such as nitrogen passes over the adsorbent media to desorb the VOC. The inert gas-VOC mixture is routed to a condenser where it is cooled to condense the VOC. The inert gas is then recycled back to the desorption chamber. The cooled VOC, now condensed into a liquid, is directed to the engine.

DETAILED DESCRIPTION OF THE INVENTION

Figure 1:
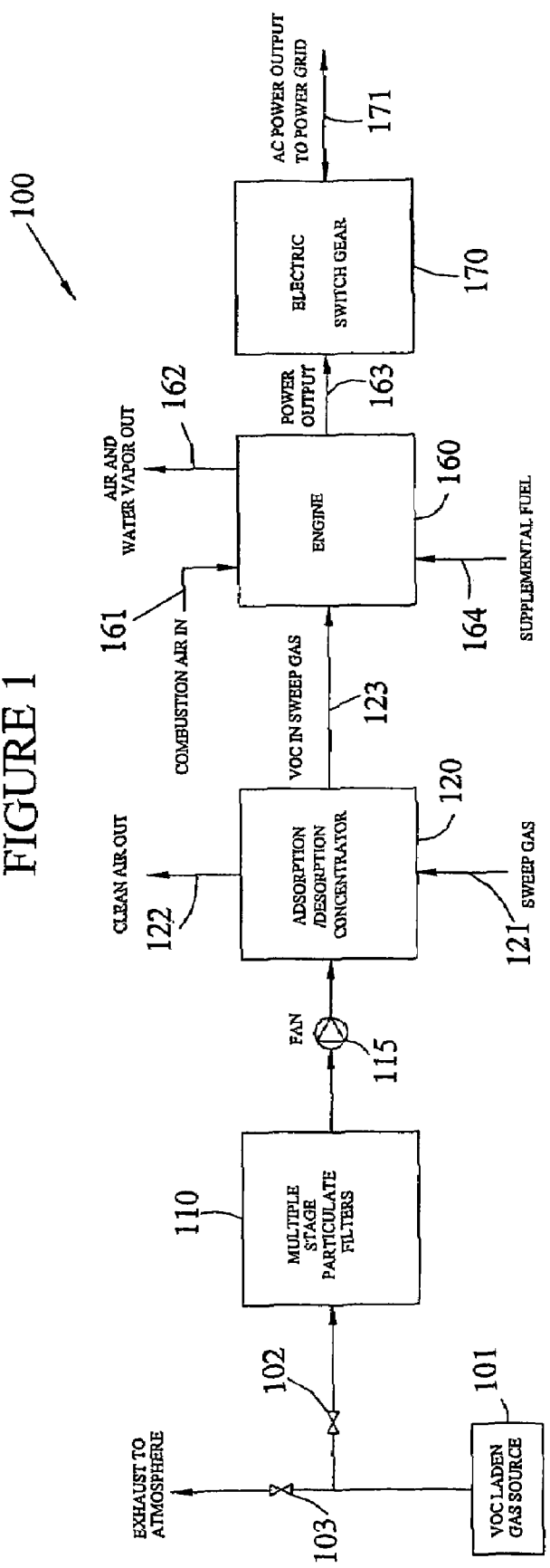
FIG. 1 illustrates a device for removing dilute VOC from a gas stream and concentrating them into a high temperature gaseous fuel consisting of mixed VOC in steam.
Figure 2:
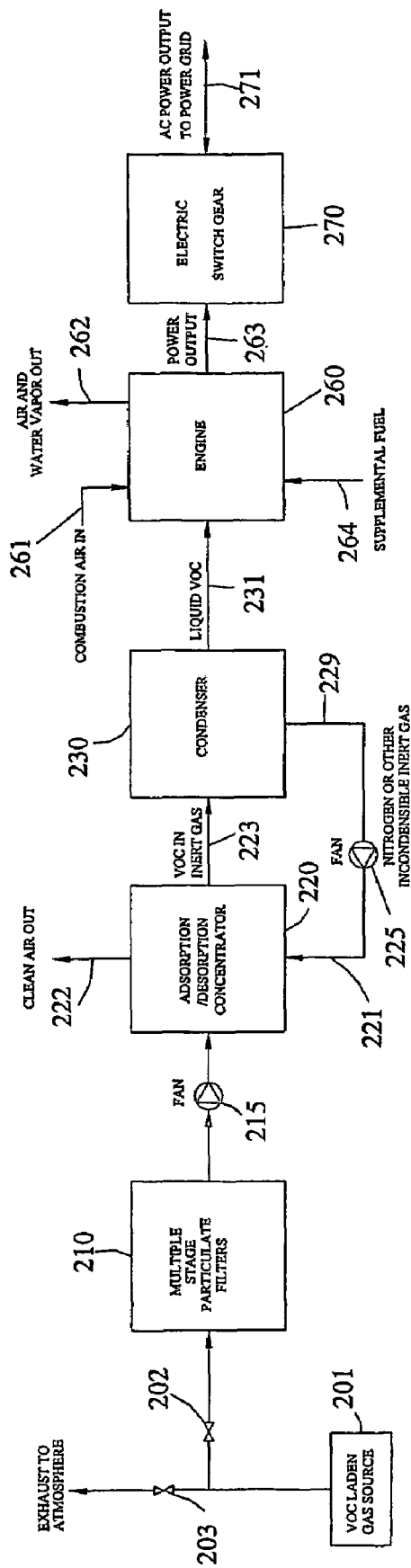
FIG. 2 illustrates a device for removing dilute VOC from a gas stream and concentrating them into a low temperature liquid fuel consisting of mixed VOC.

The present invention is illustrated in a series of drawings where like elements have the same suffix, but the initial number matches the figure reference. A table of the various elements and reference numbers is reproduced below to aid in understanding the invention:

| ELEMENT | FIG. 1 | FIG. 2 |
|---|---|---|
| DEVICE | 100 | 200 |
| SOURCE | 101 | 201 |
| DAMPER | 102 | 202 |
| DAMPER | 103 | 203 |
| FILTERS | 110 | 210 |
| FAN | 115 | 215 |
| CONCENTRATOR | 120 | 220 |
| LINE | 121 | 221 |
| VENT | 122 | 222 |
| OUTLET | 123 | 223 |
| FAN | | 225 |
| LINE | | 229 |
| CONDENSER | | 230 |
| LINE | | 231 |
| ENGINE | 160 | 260 |
| INLET | 161 | 261 |
| OUTLET | 162 | 262 |
| OUTPUT | 163 | 263 |
| VALVE | 164 | 264 |
| SWITCHGEAR | 170 | 270 |
| CONNECTOR | 171 | 271 |

In one embodiment of the invention, gaseous VOC are entrained in a sweep carrier gas and sent to an engine for destruction through combustion in an engine. The procedure provides a process that ultimately utilizes the hydrocarbons contained in the VOC to extract energy. The device reduces air emissions while using the multi-component solvents separated from the dilute VOC gas stream as fuel to produce electric or kinetic energy.

The effluent gas stream from a manufacturing process is filtered through a multiple stage filtration device if particulate material is entrained within the gas stream. Then, the gas is directed into an adsorption chamber where the VOC is removed from the waste stream onto an adsorbent media. The adsorbent media is isolated from the VOC laden gas source and heated to release, or desorb, the VOC at regular intervals. The timing of the desorb cycle is such that the level of VOC saturation on the adsorbent media does not exceed a predetermined level. Heating the VOC laden adsorbent media causes the VOC to flash to high temperature vapor, which is then directed to an engine. Engines may be used to power equipment or to operate generators to produce electricity.

An alternative embodiment of the invention uses a condenser to further process the desorbed VOC, as necessary, to provide for efficient utilization in the engine. The water and $CO_2$ gases resulting from combustion in the engine are exhausted to the atmosphere. A control device is used to monitor and control the sequence.

FIG. 1 illustrates the first embodiment of a device 100 to remove VOC from the effluent gas stream of a manufacturing process and convert the VOC into a fuel that can be used to generate electricity. As stated, the device and method may be used for industrial or other processes that produce a dilute VOC gas stream. The VOC treatment begins at the dilute VOC laden gas source 101, which allows the VOC laden gas to pass through normally open damper 102 to the inlet of an optional multiple stage particulate filter 110. The damper 102 directs the VOC gas stream to be processed by the device 100. Normally closed bypass damper 103 allows temporary exhaustion to the atmosphere when the exhaust gas treatment device 100 is not operating. A booster fan 115 directs the filtered gas stream to the inlet of the adsorption/desorption concentrator 120. The dilute VOC gas stream enters an adsorption portion of the concentrator 120 where the VOC adheres to the adsorbent media. The adsorbent media can be any commercially available adsorbent, such as activated carbon, zeolite, synthetic resin or mixtures thereof. The VOC laden adsorbent media, in a continuous loop, are directed to the desorption portion of concentrator 120 where a sweep gas composed of 200-600° F. steam from an external steam generator or boiler device enters the concentrator 120 through inlet line 121 to heat the adsorbent media and vaporize the VOC to remove them (desorb) from the adsorbent media. Alternatively, a sweep gas composed of inert combustion products or a gaseous fuel such as methane or another alkane may be used as a carrier of the desorbed VOC. An additional heat source (not shown) may be used for the desorption portion of the concentrator 120. Exhaust vent 122 allows the process gas, now cleaned of VOC, to vent to the atmosphere or be redirected for use within the process or into another manufacturing process. The concentrated VOC, now in a gaseous form and entrained in a sweep gas, exit the concentrator 120 via outlet 123, which directs the concentrated VOC to the fuel intake of engine 160, in this case a Stirling cycle engine or other engine capable of utilizing hot gaseous VOC as fuel. Supplemental fuel, such as natural gas, is available through inlet valve 164. A controller (not shown) receives a signal that is proportional to the amount of concentrated VOC supplied to the engine 160. The controller controls the proportion of supplemental fuel supplied to the engine 160 based on the amount of concentrated VOC produced by the device 100.

Atmospheric air is added through combustion air inlet 161, to enable complete, or essentially complete, oxidation of the VOC fuel. Water vapor and air are vented to the atmosphere through outlet 162. The power output 163 connects to electrical switchgear 170 that steps up the AC power produced by the engine 160 to make it compatible with the facility's internal power grid. The connection to the facility's power grid, a protected bus that enables the device to be self-supporting for emergency shutdown, is through connector 171.

While the device 100 is capable of operating on supplemental fuel, the amount of supplemental fuel added through valve 164 will be substantially below 90% and preferably near 0%. The device 100 is designed to operate completely on the energy content of the VOC fuel. Supplemental fuel is generally used in the initial device 100 start-up or when the output of the dilute VOC gas source falls below the efficient operation of device 100. Enabling the operation of device 100 exclusively on supplemental fuel provides redundant back-up power for the facility employing the device and is helpful in justifying the installation cost of the device.

The device may be scaled to accommodate large or small gas streams. In one application, an automotive paint booth was ducted to device 100. The booth provided between 2000 and 6500 scfm of dilute VOC gas in air when it was fully operational. This dilute VOC gas stream was between 10 and 1000 ppm of aromatics such as xylene, straight chains such as heptane, and oxygenated hydrocarbons such as butyl acetate. At this concentration, the dilute VOC gas stream is below the Lower Explosion Limit of VOC in air. Concentrator 120 increases the concentration of VOC to greater than 15,000 PPM and preferably to more then 200,000 PPM. Because the concentrated VOC are entrained in a sweep gas with no free oxygen and not air, the risk of explosion is no greater than that of a pressurized fuel line.

Other applications for the present invention include the capture formaldehyde and acidic acid released during the manufacture of ethanol or the VOC emitted in baking. VOC that is entrained in soil or water can be evolved into a dilute VOC gas stream that is then supplied to device 100 for processing. In another application, the device could be used to capture gasoline vapors vented from underground or above ground tanks, tanker trucks or ships or other vessels during filling or servicing. Many other applications that involve dilute VOC will be readily apparent to those skilled in the art and are contemplated by this invention.

FIG. 2 illustrates the second embodiment of a device 200 to remove VOC from the effluent gas stream of a manufacturing process and convert the VOC into a fuel that can be used to generate electricity. The VOC treatment begins at the VOC laden gas source 201, which allows VOC laden gas to pass through normally open damper 202 to the inlet of an optional multiple stage particulate filters 210. Normally closed bypass damper 203 allows temporary exhaustion to the atmosphere when the exhaust gas treatment device 200 is not operating. A booster fan 215 directs the filtered gas stream to the inlet of the adsorption/desorption concentrator 220. The dilute VOC gas stream enters an adsorption portion of the concentrator 220 where the VOC adheres to the adsorbent media as the gas passes through the concentrator 220. Exhaust vent 222 allows the process gas, now cleaned of VOC, to vent to the atmosphere or be redirected for use within the process or into another manufacturing process. The adsorbent media can be any commercially available adsorbent, such as activated carbon, zeolite, synthetic resin or mixtures thereof. The VOC laden adsorbent media, in a continuous loop, are directed to the desorption portion of the concentrator 220 where the entrained VOC are desorbed by heating the adsorbent media and passing an inert sweep gas through the concentrator 220. The VOC is entrained in the inert gas and proceeds out of the concentrator 220 via outlet 223 to a condenser 230. The condenser 230 cools the inert gas and entrained VOC to a temperature below the flash temperature of the VOC but above the condensation temperature of the inert gas, thereby separating the VOC (liquid) from the inert gas (gaseous) in the condenser 230. The inert gas is recycled through line 229 to fan 225 and through inlet line 221 into the concentrator 220. Nitrogen or other inert gas, with a condensing temperature significantly below the condensing temperature of the VOC, is used to ensure adequate separation. The VOC, now in liquid form, exit the condenser 230 through outlet 231, and flow to the fuel intake of engine 260, in this case an engine that is capable of operating on the liquid VOC. Supplemental fuel, such as natural gas, is available through inlet valve 264. Combustion air is provided through inlet line 261, to enable complete, or essentially complete, oxidation of the VOC fuel. Water vapor and air are vented to the atmosphere through outlet 262. The power output 263 connects to electrical switchgear 270 that steps up the AC power produced to make it compatible with the facility's internal power grid. The connection to the facility's power grid, a protected bus that enables the device to be self-supporting for emergency shutdown, is through connector 271. In the embodiment described in FIG. 2, the concentrated VOC fuel is essentially 1,000,000 PPM VOC.

The above descriptions of the process identify certain preferred embodiments, which are not meant to be limiting in the application of the devices described. Both embodiments reference an optional multiple stage filtration system. This filter is intended to remove any organic and inorganic particulates that may contaminate the engine. Some VOC sources may not contain particulates, and some engines may have tolerance for some particulates, therefore, the filtration system may not be needed in some applications of the process.

The concentrator is described as a moving system in which the adsorbent media is transported from adsorption portions to desorption portions. It is recognized that this can be accomplished by a fluidized bed system or a system of adsorbent media attached to a rotating wheel. Also, the concentrator could be configured such that the adsorbent media is arranged in fixed beds, and adsorption and desorption are variously alternated by controlling valves that direct the source gas flow and effluent fuel flow. The concentrator should be capable of desorbing VOC in a non-oxidizing environment, of separating the desorbed effluent from the clean gas leaving the adsorber, and be capable of concentrating the VOC such that the desorbed effluent has a hydrocarbon concentration above 15,000 PPM VOC. The sweep gases can be inert gases, steam, combustion byproducts or gaseous fuel such as methane or another alkane, such that the sweep gas does not contain free oxygen, which could react in the desorption step with the hydrocarbons present in the device. It will be apparent that the device described in this invention is constructed from commercially available components, which when operated in the particular combinations described above, form a device that generates electricity from the waste gas stream of certain manufacturing processes. The embodiments described above result in a variety of fuel types to be used in engines or turbines, including: hot gaseous fuel; and cold liquid fuel. The fuel desired will direct the choice of components in the device.

The embodiments of the invention and the types of fuel described above are not intended to limit the application of the invention. The components of the device can be recombined in other variations without departing from the concept of this invention. It is not intended to limit the application of the invention except as required by the following claims.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A device producing energy comprising:
   a dilute VOC gas stream selected from the group comprising straight chain hydrocarbons, branched hydrocarbons, aromatic hydrocarbons, oxygenated hydrocarbons and mixtures thereof;
   a concentrator having an adsorbing chamber where the dilute VOC gas stream is adsorbed on an adsorbent media and a desorbing chamber where the adsorbed VOC gas stream is desorbed by an inert sweep gas into a concentrated VOC fuel greater than 15,000 ppm;
   a second fuel;
   a controller controlling the proportion of the concentrated VOC fuel and the second fuel;
   a signal proportional to the amount of the concentrated VOC fuel supplied to the engine, wherein the controller varies the amount of the second fuel in response to the concentrated VOC fuel; and
   an engine producing energy, the engine having a fuel intake receiving the concentrated VOC fuel, whereby the engine operates by consuming a fuel mixture of the concentrated VOC fuel and the second fuel.

2. The device of claim 1, wherein concentrated VOC fuel is greater than the Lower Explosion Limit.

3. The device of claim 1, wherein the adsorbent media is selected from the group comprising activated carbon, zeolite, synthetic resin and mixtures thereof.

4. The device of claim 1, wherein the concentrator concentrates the concentrated VOC fuel to a concentration greater than 200,000 ppm.

5. The device of claim 1, wherein the sweep gas is a gaseous fuel.

6. The device of claim 1, further comprising a condenser condensing the concentrated VOC fuel into a liquid.

7. The device of claim 1, wherein the adsorbent media is in a fluidized bed.

8. The device of claim 1, wherein the adsorbent media is affixed to a rotating wheel.

9. The device of claim 1, wherein the adsorbent media is contained in fixed beds.

10. The device of claim 1, wherein the device contains filters that filter p articulates from the dilute VOC gas stream.

11. The device of claim 1, wherein the dilute VOC gas stream is between 1 ppm and 5000 ppm VOC.

12. The device of claim 1, wherein the dilute VOC gas stream is paint exhaust.

13. The device of claim 1, wherein the dilute VOC gas stream is gasoline vapor.

14. The device of claim 1, wherein the dilute VOC gas stream is formaldehyde and acidic acid.

15. The device of claim 1, wherein the engine consumes a fuel mixture of the concentrated VOC fuel and the second fuel.

16. The device of claim 15, wherein the second fuel is between 0 and 90% of the fuel mixture.

17. The device of claim 1, wherein the engine is a Stirling engine.

18. The device of claim 1, wherein the engine is an internal combustion engine.

19. The device of claim 1, wherein the engine is a gas turbine.

20. The device of claim 1, wherein the energy is electricity.

21. The device of claim 20, further comprising electric switchgear and a power grid where the switchgear conditions the electrical energy to make it compatible with the power grid.

22. A device for producing energy from a dilute VOC gas stream comprising:
   a concentrator concentrating the dilute VOC gas stream into a concentrated VOC fuel greater than 15,000 ppm., the dilute VOC gas stream selected from the group comprising straight chain hydrocarbons, branched hydrocarbons, aromatic hydrocarbons, oxygenated hydrocarbons and mixtures thereof;
   a second fuel;
   a controller controlling the proportion of the concentrated VOC fuel and the second fuel;
   an injector injecting an inert sweep gas into the concentrator to remove the concentrated VOC;
   an engine having a fuel intake receiving the concentrated VOC; and a signal proportional to the amount of the concentrated VOC fuel supplied to the engine, wherein the controller varies the amount of the second fuel in response to the concentrated VOC fuel, the engine operating on the VOC fuel.

23. The device of claim 22, wherein the concentrator includes an adsorbent media adsorbing the dilute VOC gas stream.

24. The device of claim 23, wherein the concentrator comprises an adsorbing chamber where the dilute VOC gas stream is adsorbed on the adsorbent media and a desorbing chamber where the adsorbed VOC gas stream is desorbed.

25. The device of claim 23, wherein the adsorbent media is selected from the group comprising activated carbon, zeolite, synthetic resin and mixtures thereof.

26. The device of claim 23, wherein the concentrated VOC fuel is greater than the Lower Explosion Limit.

27. The device of claim 22, wherein the concentrator concentrates the concentrated VOC fuel to a concentration greater than 200,000 ppm.

28. The device of claim 22, wherein the sweep gas is steam.

29. The device of claim 22, wherein the sweep gas is a gaseous fuel.

30. The device of claim 23, wherein the adsorbent media is in a fluidized bed.

31. The device of claim 23, wherein the adsorbent media is affixed to a rotating wheel.

32. The device of claim 23, wherein the adsorbent media is contained in fixed beds.

33. The device of claim 22, wherein the device contains filters that filter particulates from the dilute VOC gas stream.

34. The device of claim 22, wherein the dilute VOC gas stream is between 1 ppm and 5000 ppm VOC.

35. The device of claim 22, wherein the dilute VOC gas stream is paint exhaust.

36. The device of claim 22, wherein the dilute VOC gas stream is gasoline vapor.

37. The device of claim 22, wherein the dilute VOC gas stream is formaldehyde and acidic acid.

38. The device of claim 22, wherein the second fuel is between 0 and 90% of the fuel mixture.

39. The device of claim 22, wherein the engine is a Stirling engine.

40. The device of claim 22, wherein the energy is electricity.

41. The device of claim 40, further comprising electric switchgear and a power grid where the switchgear conditions the electrical energy to make it compatible with the power grid.

42. An energy producing device receiving a dilute VOC gas stream comprising:
   a concentrator that concentrates the amount of VOC per unit volume to greater than 200,000 ppm.; an inert gas injector injecting inert gas into the concentrator to remove the concentrated VOC;
   a condenser condensing VOC; and
   an engine having a fuel intake and a combustion air intake, the fuel intake receiving the condensed VOC fuel and the air intake receiving atmospheric air, the condensed VOC fuel being the primary fuel for the engine, whereby the engine produces energy.

43. The device of claim 42, wherein the concentrator includes an adsorbent media adsorbing the dilute VOC gas stream.

44. The device of claim 43, wherein the concentrator comprises an adsorbing chamber where the dilute VOC gas stream is adsorbed on the adsorbent media and a desorbing chamber where the adsorbed VOC gas stream is desorbed.

45. The device of claim 43, wherein the adsorbent media is selected from the group comprising activated carbon, zeolite, synthetic resin and mixtures thereof.

46. The device of claim 42, further comprising filters that filter particulates from the dilute VOC gas stream.

47. The device of claim 43, wherein the adsorbent media is in a fluidized bed.

48. The device of claim 43, wherein the adsorbent media is affixed to a rotating wheel.

49. The device of claim 43, wherein the adsorbent media is contained in fixed beds.

50. The device of claim 42, wherein the dilute VOC gas stream is selected from the group comprising straight chain hydrocarbons, branched hydrocarbons, aromatic hydrocarbons, oxygenated hydrocarbons and mixtures thereof.

51. The device of claim 42, wherein the dilute VOC gas stream is between 1 ppm and 5000 ppm VOC.

52. The device of claim 42, wherein the dilute VOC gas stream is paint exhaust.

53. The device of claim 42, wherein the dilute VOC gas stream is gasoline vapor.

54. The device of claim 42, wherein the dilute VOC gas stream is formaldehyde and acidic acid.

55. The device of claim 42, further comprising a second fuel, whereby the engine consumes a fuel mixture of the concentrated VOC fuel and the second fuel.

56. The device of claim 55, further comprising a controller controlling the proportion of the concentrated VOC fuel and the second fuel supplied to the engine.

57. The device of claim 56, further comprising a signal proportional to the amount of the concentrated VOC fuel supplied to the engine, wherein the controller varies the amount of the second fuel in response to the concentrated VOC fuel.

58. The device of claim 42, wherein the engine is an internal combustion engine.

59. The device of claim 42, wherein the engine is a gas turbine engine.

60. The device of claim 42, wherein the engine is a Stirling engine.

61. The device of claim 42, wherein the energy is electricity.

62. The device of claim 61, further comprising electric switchgear and a power grid where the switchgear conditions the electrical energy to make it compatible with the power grid.

63. A method of producing energy comprising:
   concentrating a dilute VOC gas stream a selected from the group comprising straight chain hydrocarbons, branched hydrocarbons, aromatic hydrocarbons, oxygenated hydrocarbons and mixtures thereof onto an adsorbent media;
   desorbing the concentrated VOC fuel with an inert sweep gas into a concentrated VOC fuel greater than 15,000 ppm;
   directing the concentrated VOC fuel to a fuel intake of an engine; directing a second fuel to the fuel intake;
   controlling the proportion of concentrated VOC fuel and second fuel supplied to the engine in response to the amount of the concentrated VOC fuel; and convening the concentrated VOC fuel into energy in the engine.

64. The method of claim 63, further comprising the step of adsorbing the dilute VOC gas stream on an adsorbent media.

65. The method of claim 64, further comprising the step of heating the adsorbent media to cause the adsorbed VOC to desorb.

66. The method of claim 63, wherein the sweep gas is steam.

67. The method of claim 63, wherein the sweep gas is a gaseous fuel.

68. The method of claim 63, further comprising the step of condensing the concentrated VOC fuel into a liquid.

69. The method of claim 64, wherein the adsorbent media is in a continuous loop.

70. The method of claim 63, further comprising the step of filtering the dilute VOC gas stream prior to the concentrating step.

71. The method of claim 63, wherein the dilute VOC gas stream is selected from the group comprising straight chain hydrocarbons, branched hydrocarbons, aromatic hydrocarbons, oxygenated hydrocarbons and mixtures thereof.

72. The method of claim 63, wherein the dilute VOC gas stream is between 1 ppm and 5000 ppm VOC.

73. The method of claim 63, wherein the dilute VOC gas stream is paint exhaust.

74. The method of claim 63, wherein the dilute VOC gas stream is gasoline vapor.

75. The method of claim 63, wherein the dilute VOC gas stream is formaldehyde and acidic acid.

76. The method of claim 63, wherein the second fuel is between 0 and 90% of the fuel mixture.

77. The method of claim 63, wherein the engine is a Stirling engine.

78. The method of claim 63, wherein the engine is an internal combustion engine.

79. The method of claim 63, wherein the engine is a gas turbine engine.

80. The method of claim 63, wherein the energy is electricity.

81. The method of claim 80, further comprising supplying the electricity to a power grid.

82. The method of claim 63, where the inert gas is nitrogen.

* * * * *